(12) United States Patent
Bichkar et al.

(10) Patent No.: US 12,221,092 B2
(45) Date of Patent: *Feb. 11, 2025

(54) DYNAMIC ADAPTION METHODS AND SYSTEM FOR A DRIVELINE DISCONNECT CLUTCH

(71) Applicant: Ford Global Technologies, LLC, Dearborn, MI (US)

(72) Inventors: Akshay Bichkar, Ann Arbor, MI (US); Jason Meyer, Canton, MI (US); Bradley D. Riedle, Northville, MI (US); Corey James Blue, Belleville, MI (US); Joseph F. Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

This patent is subject to a terminal disclaimer.

(21) Appl. No.: 17/643,715

(22) Filed: Dec. 10, 2021

(65) Prior Publication Data

US 2023/0182716 A1 Jun. 15, 2023

(51) Int. Cl.
| | |
|---|---|
| *B60W 10/02* | (2006.01) |
| *B60K 6/387* | (2007.10) |
| *B60W 10/06* | (2006.01) |
| *B60W 10/08* | (2006.01) |
| *B60W 20/40* | (2016.01) |
| *B60W 20/50* | (2016.01) |
| *B60K 6/48* | (2007.10) |

(52) U.S. Cl.
CPC ............ *B60W 20/40* (2013.01); *B60K 6/387* (2013.01); *B60W 10/026* (2013.01); *B60W 10/06* (2013.01); *B60W 10/08* (2013.01); *B60W 20/50* (2013.01); *B60K 2006/4825* (2013.01); *B60W 10/02* (2013.01); *B60W 2710/025* (2013.01); *B60W 2710/027* (2013.01)

(58) Field of Classification Search
CPC .... B60W 20/40; B60W 20/50; B60W 10/026; B60W 10/06; B60W 10/08; B60W 10/02; B60K 6/387; B60K 2006/4825
See application file for complete search history.

(56) References Cited

U.S. PATENT DOCUMENTS

| | | |
|---|---|---|
| 9,181,995 B1 | 11/2015 | Thornton et al. |
| 9,278,685 B2 | 3/2016 | Gibson et al. |
| 9,545,908 B2 | 1/2017 | Doering et al. |
| 9,566,977 B2 | 2/2017 | Gibson et al. |
| 9,657,788 B2 * | 5/2017 | Versteyhe ............... F16D 48/06 |
| 9,771,064 B2 * | 9/2017 | Nefcy .................... B60W 20/40 |
| 10,661,784 B2 * | 5/2020 | Ford .................... B60W 10/184 |
| 11,661,052 B1 * | 5/2023 | Bichkar ................ B60W 20/15 701/67 |

(Continued)

*Primary Examiner* — Gonzalo Laguarda
(74) *Attorney, Agent, or Firm* — David Kelley; McCoy Russell LLP

(57) ABSTRACT

Systems and methods for operating a driveline of a hybrid vehicle are presented. In one example, the systems and methods adjust a driveline disconnect clutch boost time duration or magnitude responsive to a pressure error and a time delay error. A driveline disconnect clutch may be operated via supplying a pressure to the driveline disconnect clutch that includes the adjusted boost time duration or magnitude.

18 Claims, 4 Drawing Sheets

(56) References Cited

U.S. PATENT DOCUMENTS

| | | | |
|---|---|---|---|
| 11,746,838 B1* | 9/2023 | Bichkar | F16D 48/066 |
| | | | 701/68 |
| 2015/0266462 A1 | 9/2015 | Johri et al. | |
| 2020/0122713 A1* | 4/2020 | Blue | B60W 50/032 |

* cited by examiner

DYNAMIC ADAPTION METHODS AND SYSTEM FOR A DRIVELINE DISCONNECT CLUTCH

FIELD

The present description relates to methods and a system for improving operation of a driveline disconnect clutch of a vehicle. The methods and system may be particularly useful for hybrid vehicles that include an engine, electric machine, and a driveline disconnect clutch.

BACKGROUND AND SUMMARY

A hybrid vehicle may include an electric machine and an engine. The electric machine may be selectively coupled and decoupled from an engine via a driveline disconnect clutch. The driveline disconnect clutch may be actuated via a fluid (e.g., transmission fluid) that is supplied to the driveline disconnect clutch via a valve and a pump. The transmission fluid viscosity may vary with transmission operating conditions and ambient temperature. In addition, part to part variability may cause on driveline disconnect clutch to operate slightly different from another driveline disconnect clutches of similar construction. One way to compensate for fluid temperature changes and other variation may be to provide open loop control adjustments to the way that the driveline disconnect clutch may be operated. However, timing of when the driveline disconnect clutch begins to close and transfer torque after it is commanded closed may vary even with open loop compensation. Therefore, it may be desirable to provide a way of reducing variation in the operation of a driveline disconnect clutch.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
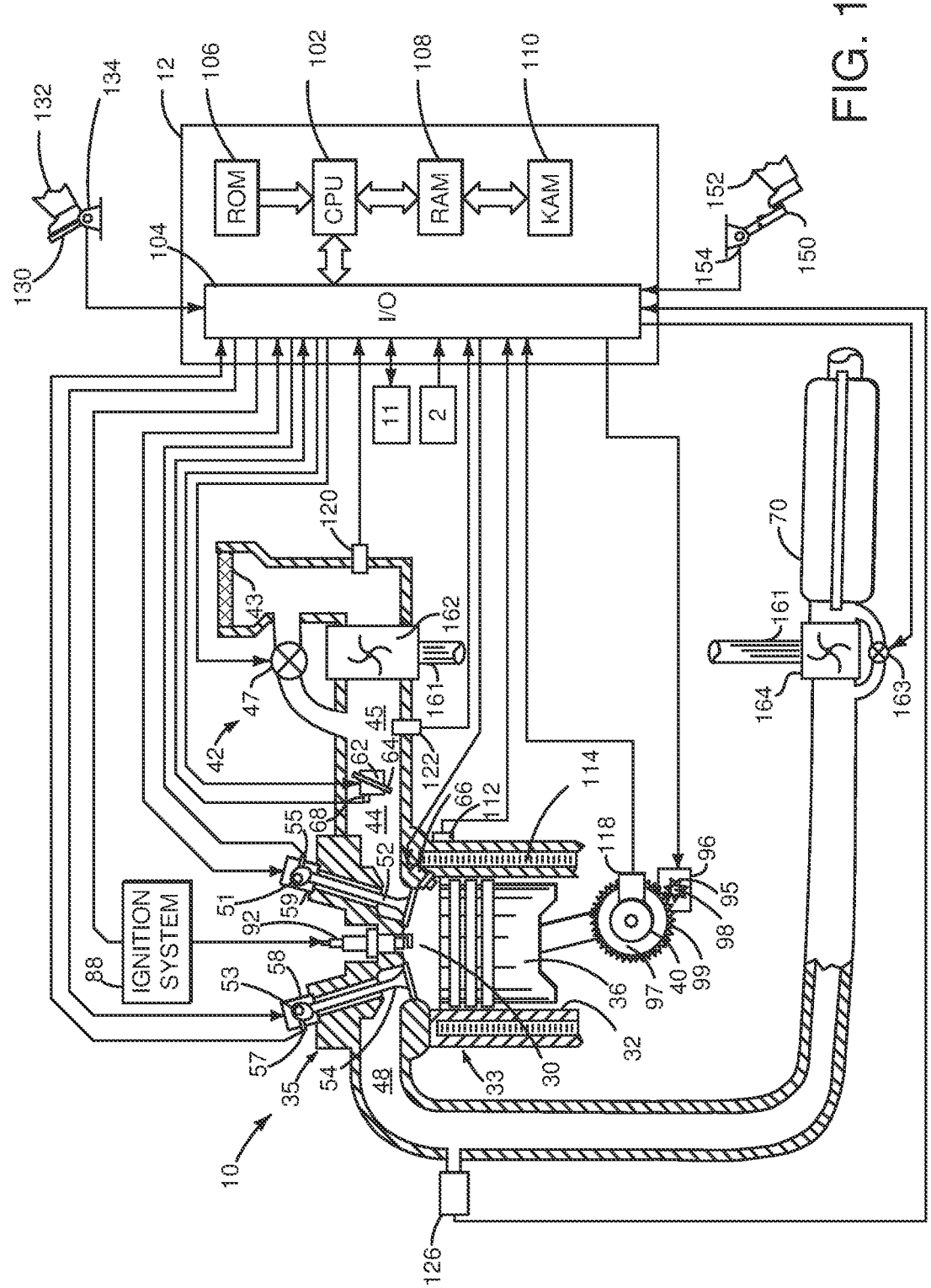
FIG. 1 is a schematic diagram of an engine.
Figure 2:
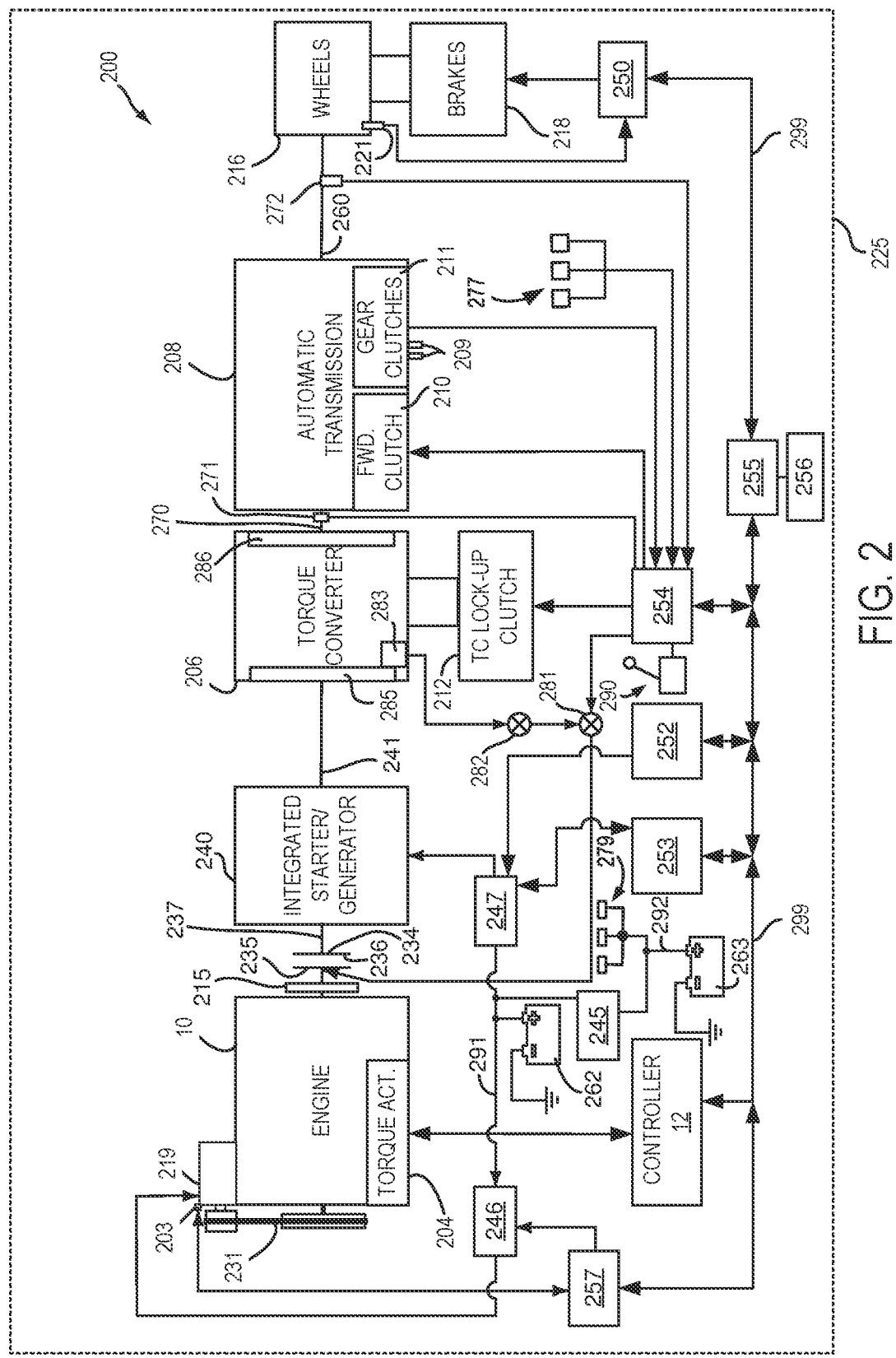
FIG. 2 is a schematic diagram of a hybrid vehicle driveline including the engine of FIG. 1.

The present description is related to adapting control parameters of a driveline disconnect clutch of a hybrid vehicle. The hybrid vehicle may include an engine as is shown in FIG. 1. The engine of FIG. 1 may be included in a powertrain or driveline as is shown in FIG. 2. The driveline may be operated according to the sequence of FIG. 3 to characterize operation of the driveline disconnect clutch. The control parameters of the driveline disconnect clutch may be adjusted or adapted according to the method of FIG. 4.

An electric machine may be selectively coupled and decoupled from an engine via a driveline disconnect clutch to conserve fuel. The electric machine may be coupled to a transmission and the transmission may be coupled to a vehicle's wheels. Control parameters of the driveline disconnect clutch may be adjusted in response to driveline disconnect clutch operation when the vehicle's wheels are decoupled from a transmission as described in U.S. Pat. No. 10,661,784. However, there may be limited opportunities to adjust driveline disconnect clutch control parameters when the vehicle's wheels are decoupled from the transmission. In addition, conditions where adaptation of driveline disconnect clutch control parameters is allowed as described by U.S. Pat. No. 10,661,784 may be limited more than may be desired.

The inventors herein have recognized the above-mentioned issues and have developed a driveline operating method, comprising: adjusting a boost pressure supplied to a driveline disconnect clutch via a controller responsive to a difference between an expected driveline disconnect clutch pressure and an observed driveline disconnect clutch pressure.

By adjusting a boost pressure that is supplied to a driveline disconnect clutch responsive to a difference between an expected driveline disconnect clutch pressure and an observed driveline disconnect clutch pressure, it may be possible to provide the technical result of compensating for driveline disconnect clutch delays and torque transferring capacity during a wide variety of real world driving conditions. In particular, the approach may be applied when a vehicle is stationary or moving. In addition, power may be delivered to a vehicle's wheels when the approach is applied. Consequently, it may be possible to reduce driveline torque disturbances that may be due to driveline disconnect clutch response delays and pressure or capacity errors.

The present description may provide several advantages. Specifically, the approach may provide improved vehicle drivability. Further, the approach may reduce degradation of driveline components. Additionally, the approach may compensate for two different types of errors while non-intrusive diagnostics are being performed on a vehicle.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Fuel injector 66 delivers liquid fuel in proportion to pulse widths provided by controller 12. Fuel is delivered to fuel injector 66 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. A user may select and/or request a vehicle drive mode (e.g., economy, track, highway, hill descent, etc.) via the human/machine interface 11.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, driveline disconnect clutch pressure sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an electric machine; a driveline disconnect clutch positioned between the engine and the electric machine; a transmission coupled to the electric machine; and a controller including executable instructions stored in non-transitory memory that cause the controller to adjust a boost duration or pressure supplied to the driveline disconnect clutch responsive to a pressure error and a delay error. The system includes where the pressure error is a difference between an expected pressure at a predetermined amount of time following a most recent reduction in boost pressure and an observed pressure at the predetermined amount of time following the most recent reduction in boost pressure. The system includes where the delay error is a time difference between a time an expected pressure reaching a predetermined pressure and a time an observed pressure reaches the predetermined pressure. The system includes where the predetermined pressure is a pressure that is substantially a fixed fraction (for e.g. 63%, which is chosen for equivalence to one time constant in a first order system) of a difference between a requested pressure and a stroke pressure, plus the stroke pressure. The system further comprises additional instructions that cause the controller to apply a weighting factor that is based on the pressure error to determine the boost duration. The system further comprises additional instructions that cause the controller to apply a weighting factor that is based on the delay error to determine the boost duration. The system further comprises additional instructions to close the driveline disconnect clutch responsive to an engine start request. The system further comprises additional instructions to determine the pressure error and the delay error based on data observed during closing of the driveline disconnect clutch.

Figure 3:
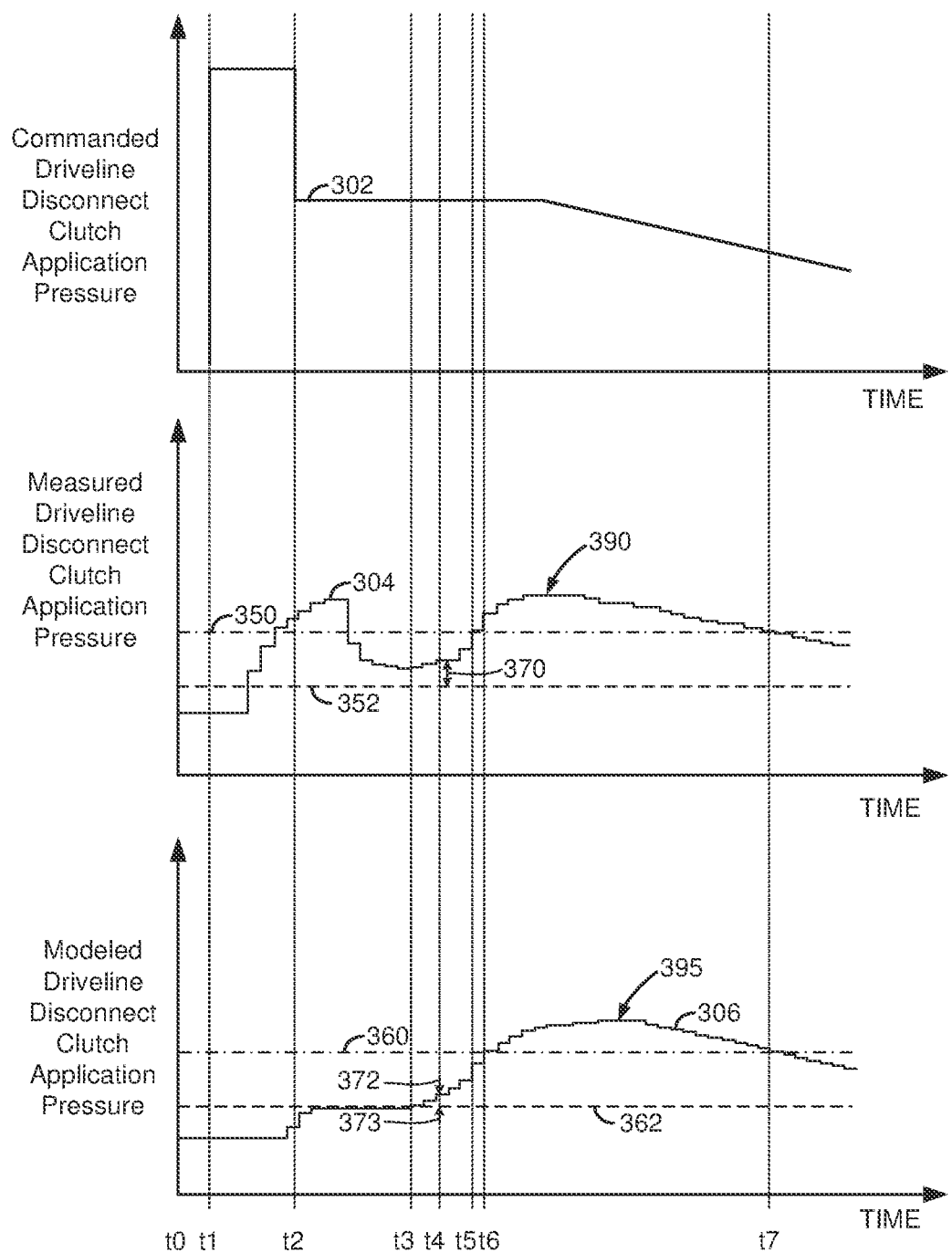
FIG. 3 is an example operating sequence for the hybrid driveline.

Referring now to FIG. 3, a prophetic driveline operating sequence is shown. In particular, a closing sequence for a driveline disconnect clutch is shown. The driveline operating sequence of FIG. 3 may be provided via the system of FIGS. 1 and 2 in cooperation with the method of FIG. 4. The vertical lines at times t0-t7 represent times of interest in the sequence. The sequence of FIG. 3 may be performed while a vehicle that includes the driveline disconnect clutch is traveling on a road and being propelled via an electric machine.

The first plot from the top of FIG. 3 is a plot of a commanded driveline disconnect clutch application pressure versus time. The vertical axis represents the commanded driveline disconnect clutch application pressure and the commanded driveline disconnect clutch pressure increases in the direction of the vertical axis arrow. The horizontal axis represents time and time increases from the left side of the plot to the right side of the plot. Trace 302 represents the commanded driveline disconnect clutch application pressure. The commanded driveline disconnect clutch application pressure is a commanded pressure of fluid that may be supplied to the driveline disconnect clutch.

The second plot from the top of FIG. 3 is a plot of an observed or measured driveline disconnect clutch application pressure (e.g., pressure that is applied to the driveline disconnect clutch by fluid) versus time. The observed or measured driveline disconnect clutch application pressure is pressure that is measured via a pressure sensor between a pressure control valve and the driveline disconnect clutch. The vertical axis represents the observed or measured driveline disconnect clutch application pressure and the observed or measured driveline disconnect clutch application pressure increases in the direction of the vertical axis arrow. The observed or measured driveline disconnect clutch application pressure is zero at the level of the horizontal axis. The horizontal axis represents time and time increases from the left side of the plot to the right side of the plot. Trace 304 represents the observed or measured driveline disconnect clutch application pressure. Horizontal line 350 represents a level of a where the driveline disconnect clutch application pressure reaches the fixed fraction (e.g. 63%) of its final commanded value when commanded via a step change in pressure. The 63% level represents one time constant for the driveline disconnect clutch (e.g., a first order system) to respond to a step change in pressure or a capacity request. Horizontal line 352 represents a stroke pressure. The stroke pressure is a pressure that is applied to the driveline disconnect clutch immediately following a boost phase of supplying pressurized fluid to the driveline disconnect clutch.

The third plot from the top of FIG. 3 is a plot of a modeled or expected driveline disconnect clutch application pressure (e.g., a modeled pressure that is expected to be achieved by the driveline disconnect clutch by fluid) versus time. The modeled or expected disconnect clutch application pressure is a pressure estimate that is output of a model. The vertical axis represents the modeled or expected driveline disconnect clutch application pressure and the modeled or expected driveline disconnect clutch application pressure increases in the direction of the vertical axis arrow. The modeled or expected driveline disconnect clutch application pressure is zero at the level of the horizontal axis. The horizontal axis represents time and time increases from the left side of the plot to the right side of the plot. Trace 306 represents the modeled or expected driveline disconnect clutch application pressure. Horizontal line 360 represents a level of a where the driveline disconnect clutch application pressure reaches the fixed fraction (e.g. 63%) of its final commanded value when commanded via a step change in pressure. Horizontal line 360 is equivalent to horizontal line 350. Horizontal line 362 represents a stroke pressure. The stroke pressure is a pressure that is applied to the driveline disconnect clutch immediately following a boost phase of supplying pressurized fluid to the driveline disconnect clutch. Horizontal line 362 is equivalent to horizontal line 352.

At time t0, a vehicle's engine (not shown) is off (e.g., not combusting air and fuel) and an electric machine (not shown) is propelling a vehicle. The commanded driveline disconnect clutch application pressure is zero and the measured or observed driveline disconnect clutch application pressure is a low value. Likewise, the modeled or expected driveline disconnect clutch application pressure is low.

At time t1, the commanded driveline disconnect clutch application pressure is increased in a step-wise fashion. Time t1 represents a beginning of a boost phase of supplying pressurized fluid to the driveline disconnect clutch. The boost phase is a phase where pressure that is supplied to the driveline disconnect clutch is increased to a higher level so that compliance within the driveline disconnect clutch plates may begin to be reduced so that the driveline disconnect clutch torque capacity may be increased. The measured or observed driveline disconnect clutch application pressure and the modeled or expected driveline disconnect clutch application pressure are unchanged.

Between time t1 and time t2, the commanded driveline disconnect clutch application pressure remains unchanged. The measured driveline disconnect clutch application pressure begins to increase after the commanded driveline disconnect clutch application pressure is increased. In addition, the measured driveline disconnect clutch application pressure begins to increase before the modeled or expected driveline disconnect clutch application pressure begins to increase. In other words, the measured or observed driveline disconnect clutch application pressure leads the modeled driveline disconnect clutch application pressure. This is mainly due to the placement of the pressure sensor measurement location, which is generally upstream of the clutch piston and thus does not indicate actual clutch piston pressure, especially during boosting.

At time t2, the commanded driveline disconnect clutch application pressure is reduced to a value at or above stroke pressure, depending on the required capacity. The measured or observed driveline disconnect clutch application pressure continues to increase as does the modeled driveline disconnect clutch fluid pressure. Between time t2 and time t3, the commanded driveline disconnect clutch fluid pressure remains constant. The modeled driveline disconnect clutch fluid pressure increases and it levels off at the stroke pressure 352. On the other hand, the measured or observed driveline disconnect clutch fluid pressure increases and then it falls to a level between threshold 350 and threshold 352.

At time t3, the stroke phase ends and the engagement or torque transfer phase begins. The end of the stroke phase may be identified as a time when pressure of fluid at the driveline disconnect clutch begins to increase after the pressure at the driveline disconnect clutch reaches the stroke pressure. The commanded driveline disconnect clutch application pressure is unchanged and the measured and modeled driveline disconnect clutch application pressures begin to increase.

At time t4, a pressure difference between the modeled driveline disconnect clutch application pressure and the measured driveline disconnect clutch pressure is determined. The pressure difference may be visualized as a difference in the length of arrow 370 and the length shown between arrows 372 and 373. The difference may be expressed via an equation as described in the method of FIG. 4. The pressure difference between the modeled driveline disconnect clutch application pressure and the measured driveline disconnect clutch application pressure is the driveline disconnect clutch pressure error.

At time t5, the measured driveline disconnect clutch application pressure crosses threshold 350 (the 63% of step change height in the commanded driveline disconnect clutch pressure above stroke threshold 352). The modeled driveline disconnect clutch application pressure continues to increase, but it has not crossed threshold 360 (the 63% of step change height in the commanded driveline disconnect clutch pressure above stroke threshold 362) in this example. The pressure value that corresponds to the 63% value of the commanded driveline disconnect clutch pressure is based on the stroke threshold 352 (which is the same as 362) and commanded pressure value of 302 at time t3. Thus, the 63% pressure value is equal to commanded pressure value of 302 at time t3 minus the stroke threshold 352 (which is the same as 362), the result of the subtraction multiplied by 0.63, and the result of the multiplication being added to the stroke threshold 352 (which is the same as 362).

At time t6, the modeled driveline disconnect clutch application pressure crosses threshold 360 (the 63% of step change height in the modeled driveline disconnect clutch pressure). The response delay between the measured driveline disconnect clutch application pressure and the modeled driveline disconnect clutch application pressure may now be determined. In particular, the amount of time between time t5 and time t6, is the driveline disconnect clutch response delay error. The pressure value that corresponds to the 63% value of the commanded driveline disconnect clutch application pressure is same as described above.

Between time t6 and time t7, the driveline disconnect clutch is actuated to coordinate and complete the engine start before being fully closed and locked (e.g., less than a predetermined speed difference across the driveline disconnect clutch) beyond t7 (not shown). The commanded driveline disconnect clutch application pressure is gradually reduced and the measured driveline disconnect clutch pressure increases and then it decreases. Likewise, the modeled driveline disconnect clutch application pressure increases and then it gradually decreases. The engagement phase ends when the clutch is fully closed and locked.

In this way, driveline disconnect clutch delay error and pressure error may be determined so that boost timing adjustments may be made. By considering both the driveline disconnect clutch delay error and pressure error, it may be possible to adjust clutch boost by adjusting a single parameter (boost duration) or multiple parameters (such as boost duration, boost commanded value, duty cycle etc.) to correct for both driveline disconnect clutch delay error and driveline disconnect clutch pressure error.

Figure 4:
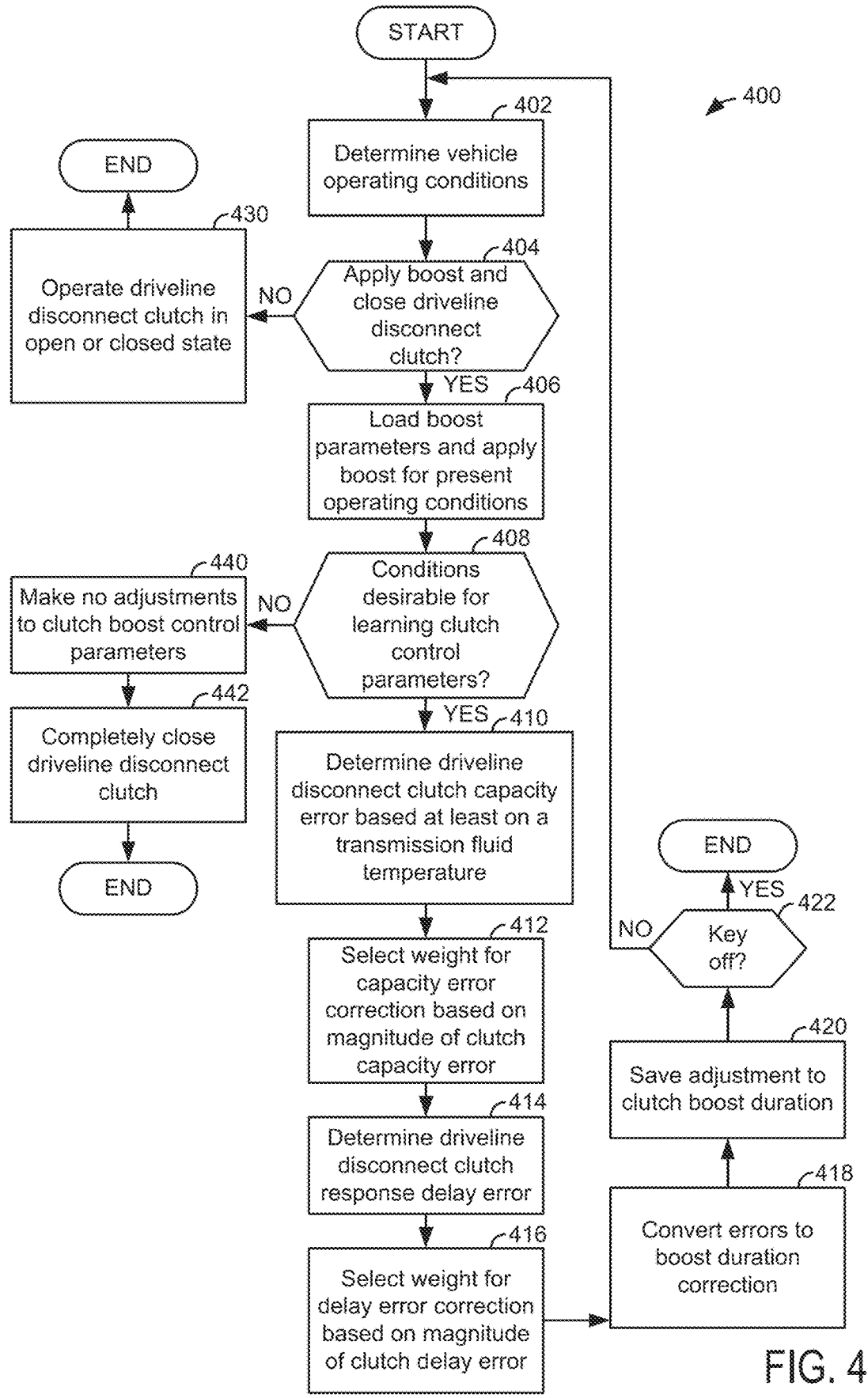
FIG. 4 is a method for operating the hybrid driveline.

Referring now to FIG. 4, a method for operating a driveline is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3 and the method may be performed while the vehicle is stationary, while the vehicle is being propelled via an electric machine, or when the vehicle is moving and not being propelled via the electric machine.

At 402, method 400 determines vehicle operating conditions. Vehicle operating conditions (e.g., data) may be determined via receiving inputs as shown in FIGS. 1 and 2 into a controller. Vehicle operating conditions may include but are not limited to vehicle speed, engine speed, engine torque, driver demand torque, driveline disconnect clutch operating state, miles traveled by the vehicle, transmission operating state, driveline disconnect clutch application pressure, ISG speed, ISG torque, and ambient temperature. Method 400 proceeds to 404 after vehicle operating conditions are determined.

At 404, method 400 judges if boost pressure is to be supplied to the driveline disconnect clutch to close the driveline disconnect clutch from a fully open position. If so, the answer is yes and method 400 proceeds to 406. Otherwise, the answer is no and method 400 proceeds to 430. Method 400 may judge to supply boost pressure (e.g., increase the driveline disconnect clutch application pressure for fluid that may be supplied to the driveline disconnect clutch) in response to an engine start request. The engine start request may be generated via a controller in response to vehicle operating conditions. The engine start request may be made while the vehicle in which the engine resides is moving, or alternatively, stationary.

At 430, method 400 operates the driveline disconnect clutch in its present state. For example, if the driveline disconnect clutch is open, method 400 may continue to hold the driveline disconnect clutch open. If the driveline disconnect clutch is closed, method 400 may continue to operate the driveline disconnect clutch in a fully closed state. Method 400 may also open the driveline disconnect clutch during low driver demand conditions or when the vehicle is deactivated. Method 400 proceeds to exit.

At 406, method 400 loads driveline disconnect clutch boost pressure control parameters including previous adaptive adjustments and begins closing the driveline disconnect clutch according to the driveline disconnect clutch boost pressure control parameters. The boost pressure control parameters may control the level, duration, end timing of boost pressure, and start timing of boost pressure that may be supplied to the driveline disconnect clutch. Method 400 may adjust a position of a valve (e.g., a pressure control valve) responsive to the driveline disconnect clutch boost pressure control parameters. Method 400 proceeds to 408.

At 408, method 400 judges if conditions are desirable to adjust or learn driveline disconnect clutch control parameters, such as transmission fluid temperature being greater than a threshold temperature. In addition, method 400 may require other conditions to be present for learning driveline disconnect clutch control parameters, such as the vehicle traveling a particular distance or the driveline disconnect clutch closing a particular number of times. If method 400 judges that the conditions are present, the answer is yes and method 400 proceeds to 410. Otherwise, the answer is no and method 400 proceeds to 440.

At 440, method 400 makes no changes to the driveline disconnect clutch control parameters. Method 400 proceeds to 442.

At 442, method 400 loads the boost control parameters and delivers the boost pressure to the driveline disconnect clutch conforming to the control parameters. The boost pressure may be applied according to the parameters that are determined at 406. Method 400 completes fully closing the driveline disconnect clutch after the boost pressure is delivered to the driveline disconnect clutch. Method 400 applies the boost pressure, drops the boost pressure, and supplies pressure to the driveline disconnect clutch after the stroke phase is complete as shown in FIG. 3. Method 400 proceeds to exit.

At 410, method 400 determines a driveline disconnect clutch pressure or capacity error. Method 400 monitors a pressure of fluid that is supplied to the driveline disconnect clutch. The pressure may be indicative or driveline disconnect clutch capacity. As such, the pressure that is supplied to the driveline disconnect clutch may be converted into a driveline disconnect clutch torque capacity via a function that outputs driveline disconnect clutch capacity based on a pressure that is supplied to the driveline disconnect clutch.

Method 400 also estimates the pressure of fluid that is supplied to the driveline disconnect clutch via a model. The model may output driveline disconnect clutch pressure as a function of a valve position, a pump speed, and transmission fluid pressure. Method 400 determines the driveline disconnect clutch pressure error via the following equation:

$$DIS\_Pres\_err = (DISMod\_prs\_t1 - DIS\_prs\_t1) \quad (1)$$

where DIS_Pres_err is a driveline disconnect clutch boost pressure error, argument DISMod_prs_t1 is the modeled driveline disconnect clutch pressure at time t1, DIS_prs_t1 is the measured or observed driveline disconnect clutch pressure at time t1, time t1 is a time in a driveline disconnect clutch closing sequence that is a determined time after the boost pressure supplied to the driveline disconnect clutch during the driveline disconnect clutch closing sequence is reduced. The time t1 may be a function of transmission fluid temperature and commanded driveline disconnect clutch pressure or capacity. For example, time t1 may be expressed via the following equation:

$$t1 = t0 + f1(Tf, CDDp) \quad (2)$$

where t0 is a time where the time at the end of the boost phase for a present driveline disconnect clutch closing event, f1 is a function that returns an offset to time t0, Tf is transmission fluid temperature (e.g., temperature of fluid that closes the driveline disconnect clutch), and CDDp is the commanded driveline disconnect clutch pressure or capacity. The measured or observed driveline disconnect clutch pressure may be determined via the following equation:

$$DISMod\_prs\_t1 = f2(t\_close, Tf, CDDp) \quad (3)$$

where f2 is a function that returns the modeled driveline disconnect clutch pressure, t_close is an amount of time since the driveline disconnect clutch was commanded closed, Tf is transmission fluid temperature (e.g., temperature of fluid that closes the driveline disconnect clutch), and CDDp is the commanded driveline disconnect clutch pressure or capacity. It should be noted that equations 1-3 may be written in terms of driveline disconnect clutch torque capacity instead of driveline disconnect clutch pressure, if desired. Method 400 proceeds to 412.

At 412, method 400 selects a value of a weighting factor w1 for driveline disconnect clutch pressure or capacity error. In one example, the weighting factor w1 for driveline disconnect clutch pressure error may be empirically determined via adjusting the weighting factor w1 and monitoring the driveline disconnect clutch pressure error during and after closing the driveline disconnect clutch. The empirically determined weighting factor w1 may be stored in controller memory and it may be retrieved during learning of the driveline disconnect clutch pressure error. In one example, the weighting factor w1 for the driveline disconnect clutch pressure error may be a function of operating conditions (e.g., driveline disconnect clutch boost pressure error, commanded driveline disconnect clutch pressure, and transmission fluid temperature) and the weighting factor w1 may be retrieved from controller memory via referencing a function or table according to the commanded driveline disconnect clutch pressure and transmission fluid temperature. Method 400 proceeds to 414.

At 414, method 400 determines a driveline disconnect clutch response delay error. Method 400 monitors a pressure of fluid that is supplied to the driveline disconnect clutch and determines the response delay based on the pressure of fluid that is supplied to the driveline disconnect clutch. Alternatively, the driveline disconnect clutch response delay may be determined from an estimated driveline disconnect clutch torque capacity that is based on driveline disconnect clutch pressure. In particular, method 400 determines a time at which estimated driveline disconnect clutch capacity reaches a fixed threshold/fraction such as 63% of its final commanded value, where the driveline disconnect clutch capacity may be estimated from driveline disconnect clutch pressure.

Method 400 also estimates the pressure of fluid that is supplied to the driveline disconnect clutch via a model as described by equation 3, for example. The model may output driveline disconnect clutch pressure as a function of a commanded driveline disconnect clutch pressure or capacity and transmission fluid pressure. Method 400 determines the driveline disconnect clutch response delay error via the following equation:

$$DIS\_Dly\_err=(DISMod\_prs\_63-DIS\_prs\_63) \quad (4)$$

where DIS_Dly_err is the driveline disconnect clutch response delay error, DISMod_prs_63 is the modeled driveline disconnect clutch pressure at a time when the modeled driveline disconnect clutch pressure reaches substantially a fixed fraction such as 63% (e.g., within ±10% of the modeled driveline disconnect clutch pressure) of its final commanded value, and where DIS_prs_63 is the measured or observed driveline disconnect clutch pressure at a time when the measured or observed driveline disconnect clutch pressure reaches substantially 63% (e.g., within ±10% of the modeled driveline disconnect clutch pressure) of its final commanded value. The fixed fraction such as 63% threshold value for both the modeled driveline disconnect clutch pressure and the measured or observed driveline disconnect clutch pressure is based on the stroke threshold 352/362 and commanded pressure value of 302 at time t3 (i.e., the threshold is equal to commanded pressure value of 302 at time t3 minus the stroke threshold 352/362, the result of the subtraction multiplied by 0.63, and the result of the multiplication being added to the stroke threshold 352/362), as mentioned in the discussion of FIG. 3. Method 400 proceeds to 416 after the driveline disconnect clutch response delay error is determined.

At 416, method 400 selects a value of a weighting factor w2 for driveline disconnect clutch response delay error. In one example, the weighting factor w2 for driveline disconnect clutch response delay error may be empirically determined via adjusting the weighting factor w2 and monitoring the driveline disconnect clutch response delay error during and after closing the driveline disconnect clutch. The empirically determined weighting factor w2 may be stored in controller memory and it may be retrieved during learning of the driveline disconnect clutch response delay error. In one example, the weighting factor w2 for the driveline disconnect clutch response delay error may be a function of operating conditions (e.g., magnitude of driveline disconnect clutch response error, commanded driveline disconnect clutch pressure and transmission fluid temperature) and the weighting factor w2 may be retrieved from controller memory via referencing a function or table according to the commanded driveline disconnect clutch pressure and transmission fluid temperature. Method 400 proceeds to 418.

At 418, method 400 converts the driveline disconnect clutch response delay error and the driveline disconnect clutch application pressure error to a boost correction value. In one example, the driveline disconnect clutch response delay error and the driveline disconnect clutch application pressure error may be applied to control boost pressure duration according to the following equation:

$$FF\_boost=f3(Tf,ImpN,EngN)+AdptCor \quad (5)$$

where FF_boost is the duration that boost pressure is applied to open the driveline disconnect clutch, f3 is a function that returns an open loop boost pressure duration (e.g., 200 milliseconds) Tf is temperature of the fluid that is supplied to open the driveline disconnect clutch, ImpN is torque converter impeller speed, EngN is engine speed, and AdptCor is an adaptive correction term for adjusting the boost pressure during closing of the driveline disconnect clutch. Of course, additional or fewer parameters may be applied to determine the duration that boost pressure is applied to open the driveline disconnect clutch.

The adaptive boost pressure duration correction term may be described via the following equation:

$$AdptCor=(wt1 \cdot Old\_AdptCor)+(wt2 \cdot CFerr) \quad (6)$$

where AdptCor is the adaptive correction term, wt1 is the weighting factor for old adaptive correction and may be a function of operating conditions (similar to previously described w1 and w2), old_AdptCor is a most recent prior AdptCor value, wt2 is the weighting factor for new adaptive correction and may be a function of operating conditions (similar to previously described w1 and w2), and CFerr is the boost pressure duration correction. The boost pressure duration correction may be determined via the following equation:

$$CFerr=f4(DIS\_Pres\_err,CDDp) \cdot w3+f5(DIS\_DLy\_err, CDDp) \cdot w4 \quad (7)$$

where f4 is a function that returns a first boost pressure adjustment value, w3 and w4 are adjustable weighting factors (numerical values) which may be a function of operating conditions (similar to previously described weighting factors), and f5 is a function that returns a second boost pressure adjustment. Thus, the boost pressure duration may be adjusted in response to a driveline disconnect clutch pressure error and a driveline disconnect clutch response delay. Alternatively, the boost pressure magnitude may be adjusted via a similar equation. Method 400 proceeds to 420.

At 420, method 400 saves or stores to controller memory the adapted boost pressure duration correction AdptCor. Method 400 proceeds to 422.

At 422, method 400 judges if the vehicle has been deactivated via turning a key to an "off" position, or by deactivating the vehicle in another known way. If so, the answer is yes and method 400 proceeds to exit. Otherwise, the answer is no and method 400 returns to 402.

In this way, a boost pressure duration or boost pressure magnitude supplied during closing of a driveline disconnect clutch may be adapted to compensate for changes in driveline disconnect clutch operation. The boost pressure adjustment may then be applied during subsequent closings of the driveline disconnect clutch so that torque capacity of the driveline disconnect clutch may begin as expected during closing of a driveline disconnect clutch.

Thus, the method of FIG. 4 provides for a driveline operating method, comprising: adjusting a boost pressure supplied to a driveline disconnect clutch via a controller responsive to a difference between an expected driveline disconnect clutch pressure and an observed driveline disconnect clutch pressure. The method includes where the difference is the expected driveline disconnect clutch pressure at a predetermined amount of time after most recently ending a boost phase of adjusting a driveline disconnect clutch pressure minus the observed driveline disconnect clutch pressure at the predetermined amount of time after most recently ending the boost phase of adjusting the driveline disconnect clutch pressure. The method includes where the predetermined amount of time is based on a commanded driveline disconnect clutch pressure. The method includes where adjusting the boost pressure includes adjusting the boost pressure according to a weighted value, the weighted value based on a magnitude of an error. The method includes where the error is the difference between the expected driveline disconnect clutch pressure and the observed driveline disconnect clutch pressure. The method further comprises closing the driveline disconnect clutch in response to a request to start an engine while an ISG is propelling a vehicle that includes the engine and the driveline disconnect clutch. The method includes where the boost pressure is supplied to the driveline disconnect clutch during an engine start following an engine start in which the difference was generated.

The method of FIG. 4 also provides for a driveline operating method, comprising: adjusting a boost pressure supplied to a driveline disconnect clutch via a controller responsive to a time delay error between an expected driveline disconnect clutch pressure and an observed driveline disconnect clutch pressure. The method includes where the expected driveline disconnect clutch pressure is a pressure that is between a requested pressure and a stroke pressure. The method includes where the observed driveline disconnect clutch pressure is a pressure between the stroke pressure and the stroke pressure. The method includes where adjusting the boost pressure includes adjusting a duration of the boost pressure. The method includes where the driveline disconnect clutch is positioned in a driveline between an engine and an electric machine.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
adjusting a boost pressure supplied to a driveline disconnect clutch via a controller responsive to detecting a driveline disconnect clutch pressure error, wherein the driveline disconnect clutch pressure error is detected based on a difference between an expected driveline disconnect clutch pressure and an observed driveline disconnect clutch pressure, where adjusting the boost pressure includes adjusting the boost pressure according to a value of a weighting factor for the driveline disconnect clutch pressure error, the value of the weighting factor for the driveline disconnect clutch pressure error determined based on a function of a transmission fluid temperature and a magnitude of the driveline disconnect clutch pressure error.

2. The method of claim 1, where the difference is the expected driveline disconnect clutch pressure at a predetermined amount of time after most recently ending a boost phase of adjusting a driveline disconnect clutch pressure minus the observed driveline disconnect clutch pressure at the predetermined amount of time after most recently ending the boost phase of adjusting the driveline disconnect clutch pressure.

3. The method of claim 2, where the predetermined amount of time is based on a commanded driveline disconnect clutch pressure.

4. The method of claim 1, further comprising closing the driveline disconnect clutch in response to a request to start an engine while an ISG is propelling a vehicle that includes the engine and the driveline disconnect clutch.

5. The method of claim 1, where the boost pressure is supplied to the driveline disconnect clutch during an engine start following an engine start in which the difference was generated.

6. The method of claim 1, wherein determining the weighting factor based on the function of the weighting factor comprises referencing a table.

7. The method of claim 6, wherein the table comprises empirically determined values for the weighting factor, the empirically determined values determined by adjusting the weighting factor and monitoring the driveline disconnect clutch pressure error during and after closing the driveline disconnect clutch.

8. A system, comprising:
an engine;
an electric machine;
a driveline disconnect clutch positioned between the engine and the electric machine;
a transmission coupled to the electric machine; and
a controller including executable instructions stored in non-transitory memory that cause the controller to adjust a boost duration or pressure supplied to the driveline disconnect clutch responsive to detecting a pressure error and a delay error, the boost duration determined by applying a weighting factor, the weighting factor being a function of a transmission fluid temperature and a magnitude of the pressure error.

9. The system of claim 8, where the pressure error is a difference between an expected pressure at a predetermined amount of time following a most recent reduction in boost pressure and an observed pressure at the predetermined amount of time following the most recent reduction in boost pressure.

10. The system of claim 8, where the delay error is a time difference between a time an expected pressure reaches a predetermined pressure and a time an observed pressure reaches the predetermined pressure.

11. The system of claim 10, where the predetermined pressure is a pressure that is substantially 63% of a difference between a requested pressure and a stroke pressure, plus the stroke pressure.

12. The system of claim 8, further comprising additional instructions that cause the controller to adjust the boost duration by applying a second weighting factor that is based on the delay error.

13. The system of claim 8, further comprising additional instructions to close the driveline disconnect clutch responsive to an engine start request.

14. The system of claim 13, further comprising additional instructions to determine the pressure error and the delay error based on data observed during closing of the driveline disconnect clutch.

15. A driveline operating method, comprising:

adjusting a boost pressure by adjusting a duration of the boost pressure supplied to a driveline disconnect clutch via a controller responsive to a time delay error between an expected driveline disconnect clutch pressure and an observed driveline disconnect clutch pressure, the duration determined by applying a weighting factor, the weighting factor being a function of a transmission fluid temperature a magnitude of the time delay error.

16. The method of claim 15, where the expected driveline disconnect clutch pressure is a pressure that is between a requested pressure and a stroke pressure.

17. The method of claim 16, where the observed driveline disconnect clutch pressure is a pressure between the requested pressure and the stroke pressure.

18. The method of claim 17, where the driveline disconnect clutch is positioned in a driveline between an engine and an electric machine.

\* \* \* \* \*